UNITED STATES PATENT OFFICE.

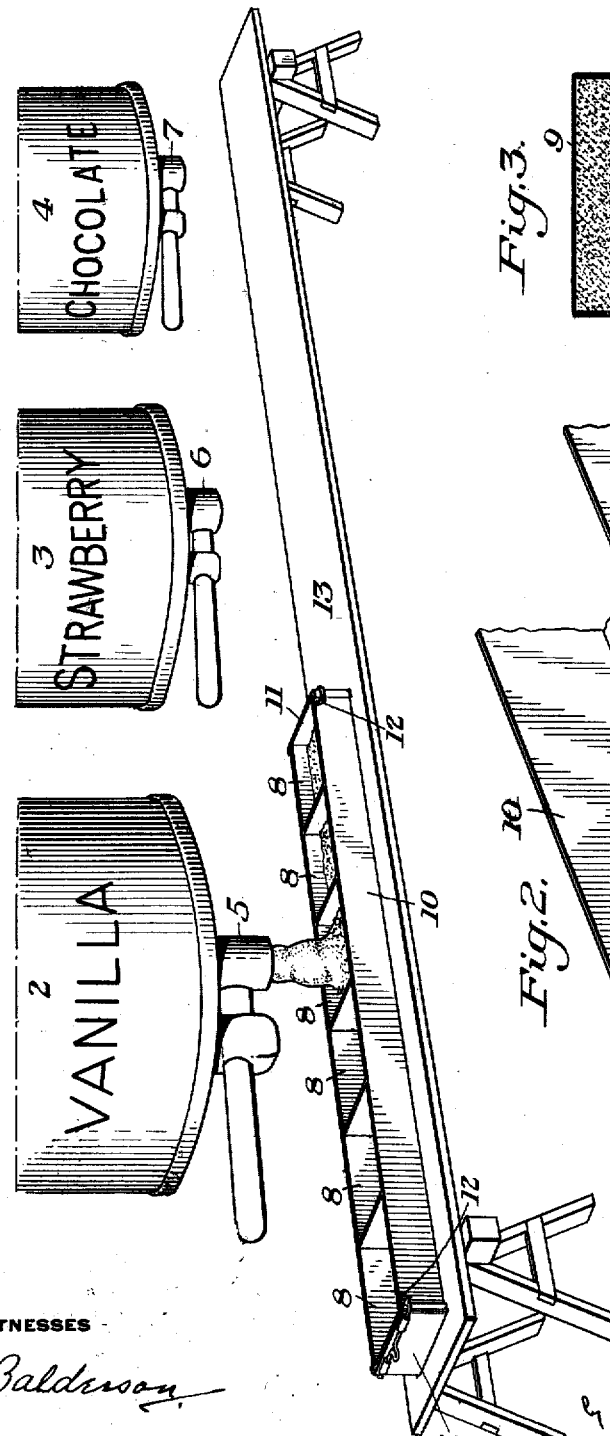

JOHN B. DALTON, OF PITTSBURGH, PENNSYLVANIA.

PACKAGING ICE-CREAM.

1,313,793.  Specification of Letters Patent.  Patented Aug. 19, 1919.

Application filed March 13, 1919. Serial No. 282,371.

*To all whom it may concern:*

Be it known that I, JOHN B. DALTON, a citizen of the United States, residing at Pittsburgh, in the county of Allegheny and State of Pennsylvania, have invented a new and useful Improvement in Packaging Ice-Cream, of which the following is a full, clear, and exact description, reference being had to the accompanying drawings, forming part of this specification, in which—

Figure 1 is a diagrammatic perspective view showing the filling of the containers.

Fig. 2 is a perspective view showing one end of the container holding trough, and Fig. 3 is a vertical section through the container as filled with ice cream.

The present invention relates to packaging ice cream and more particularly to the packaging of ice cream in the paper containers in which it is delivered to the customer.

The object of the invention is to minimize the handling of the ice cream and to provide a more economical and more sanitary method of procedure. With this object in view the present invention consists in the method of packaging ice cream and the article produced thereby, as hereinafter described, and more particularly pointed out in the claims.

In making brick ice cream, the usual commercial method use heretofore has been as follows:—A long metal mold was filled with the ice cream and put away to chill and thereby harden. After chilling, which usually occupied from 12 to 24 hours, the mold was dipped in hot water and the long block of ice cream dumped out onto a bench. An operator then severed the long block of ice cream into a number of bricks of the desired size. These bricks were then seized by the hand of the operator, wrapped in paper and put into paper containers. The containers containing the bricks thus cut were then put into the chilling room to repair the softening to which the ice cream was subjected during the cutting into the individual bricks.

Although this method gave an article which the trade desired, namely, a brick of ice cream contained in a paper box which went to the user and was thrown away after use, this method was not only expensive but unsanitary. The ice cream had to be first chilled, then manipulated by the operator who generally seized the bricks with his fingers, often leaving thumb marks which persisted in the bricks when delivered to the customer. The ice cream had to be chilled twice, once in the large brick and afterward in the smaller bricks.

It has also been the practice in supplying the customer, for the dealer, such as a druggist, or soda fountain proprietor, to purchase ice cream in large freezers and then to dip out the ice cream when purchased by the customer and fill paper buckets with it. This has been unsatisfactory both for the dealer and the customer. The customer notes that there are voids in the ice cream which is necessarily dipped out in the hardened condition, and thinks he is getting short measure. On the other hand, the dealer in order to satisfy the customer presses down the ice cream into the paper bucket thereby causing its sides to bulge and giving the customer actually more than the rated capacity of the bucket.

In order to overcome the objections to the previous process and to deliver the ice cream to the customer in a paper container fully filled with the ice cream, I fill the paper container with the ice cream while the ice cream is in a plastic condition and thereafter chill the ice cream in the paper container. This obviates any manual contact with the ice cream after it is drawn from the freezer and before the paper container is opened by the customer. It also insures that the customer receives his paper container fully filled with the ice cream. In filling the container, which is usually a rectangular paper box, I preferably support the sides of the container while it is being filled, and thereby prevent the sides from bulging, which would make an unsightly package and also cause it to contain more ice cream than it should.

Referring now to the drawings which illustrate an apparatus for carrying out my method; three freezers are indicated by reference numerals 2, 3 and 4. The three freezers are supplied with spouts 5, 6 and 7, respectively. The ice cream in the freezers is in a plastic or semi-liquid condition so that it flows readily through the spouts as will be understood by any one skilled in the commercial ice cream making art.

The paper containers which are illustrated as of the box type consist of a body portion 8, and a cover 9, which fits over or telescopes over the body portion. The containers or boxes are made of heavy paraffined paper. The word "paper", as applied to the material from which the containers are made, is intended as a word of general description and not of limitation, and to include paper or like materials which are commonly used for such purposes.

The body portions 8 of a number of containers are placed in a long open topped metal trough or magazine 10. This trough is made of such a length that it will hold a predetermined number of containers. As placed in this trough, the sides of each container are supported either by the walls of the trough or by the sides of adjacent containers. The trough 10 has hinged ends 11 which are retained by latches 12.

After the containers, or more strictly speaking, the body portions 8 of the paper boxes, are placed in the trough 10, one end of the trough 10 is placed beneath one of the spouts and is then moved along on the bench 13 under the spout. The stream of ice cream is allowed to flow from the spout without interruption as the trough with its containers is moved along under its spouts. As the containers are placed close side by side, this permits them to be filled quickly but without spilling the ice cream.

In case the bricks are to be made all of one flavor, the trough is moved along so as to permit the several containers to be fully filled. In case the bricks are to be layer bricks, the trough is moved along to fill the containers to the proper depth to form the layers of the different flavors of ice cream.

As shown in Fig. 1, three freezers of vanilla, strawberry and chocolate ice cream are provided to make a three-layer brick. However, if a vanilla brick is desired, only the vanilla freezer need be used. After the containers are filled, the ends 11 of the trough 10 are let down and a row of paper boxes are shoved onto a bench where an operator applies the covers to the containers. The containers are then placed in the cooling room where the ice cream is chilled from twelve to twenty-four hours to harden it. The containers are then removed from the cooling room, preferably wrapped with an outside wrapping paper and are in condition to be delivered to the customer.

While the method and the article of the present invention have been specifically illustrated and described, it is to be understood that the invention is not limited to the details of description, but may be varied and otherwise practised within the scope of the following claims:

I claim:

1. The method of packaging ice cream in merchantable units which consists in filling a paper container with the ice cream while in a plastic condition and thereafter chilling the ice cream to a hardened condition in the paper container; substantially as described.

2. The method of packaging ice cream in merchantable units which consists in filling a paper container with the ice cream while in a plastic condition and supporting the walls of the container during the filling operation and thereafter chilling the ice cream to a hardened condition in the paper container; substantially as described.

3. As a new article of manufacture, a merchantable unit comprising an ice cream brick and a paper container inclosing and protecting the ice cream brick and into which the ice cream had been run in a plastic condition so as to completely fill the same, and subsequently hardened therein; substantially as described.

In testimony whereof I have hereunto set my hand.

JOHN B. DALTON.